United States Patent Office 2,953,590
Patented Sept. 20, 1960

2,953,590
PRODUCTION OF ALKYLENE DIISOCYANATES

Johannes Pfirschke, Leverkusen-Bayerwerk, Germany, assignor, by mesne assignments, of one-half to Mobay Chemical Company, Pittsburgh, Pa., a corporation of Delaware, and one-half to Farbenfabriken Bayer Aktiengesellschaft, Leverkusen, Germany, a corporation of Germany No Drawing. Filed Apr. 9, 1954, Ser. No. 422,248
Claims priority, application Germany Apr. 11, 1953
5 Claims. (Cl. 260—453)

This invention relates to an improvement in the production of alkylene diisocyanates.

It is well known to produce alkylene diisocyanates, such as hexamethylene diisocyanate, by the so-called carbamic acid phosgenation (see German Patent 876,238). In carrying out this method the aliphatic diamine serving as the starting material is reacted with dry carbon dioxide to form the salt of the carbamic acid by dissolving the amine in the solvent in which the subsequent phosgenation is to be carried out and introducing into the solution of the diamine in said solvent carbon dioxide at a temperature ranging from about 60 to about 80° C. while stirring. The suspension of the carbaminate thus obtained is then added at a temperature around 0° C. to a solution of phosgene (so-called cold phosgenation) whereupon the mixture is heated to about 160 to 180° C. while introducing phosgene for a period of 20 to 25 hours to thereby finish the phosgenation (so-called hot phosgenation). The yields obtained in technical operations according to this method amount to about 70% of the theoretical.

It is an object of the present invention to provide an improved process for the production of alkylene diisocyanates. Another object is to provide a process of producing alkylene diisocyanates in high yields and in a high state of purity. A further object is to provide a method of producing alkylene diisocyanates without the formation of substantial amounts of undesirable by-products. Still further objects will appear hereinafter.

These objects are attained in accordance with the present invention by adding in the presence of excess carbon dioxide a solution of the alkylene diamine in an inert solvent to an inert solvent at a temperature within the range of 0 to +15° C. and subsequently subjecting the carbaminate thus obtained at first to the cold phosgenation and then to the hot phosgenation.

A mode of carrying out the process of the invention involves placing a solvent and carbon dioxide in a suitable vessel and adding a solution of the alkylene diamine in the same solvent while introducing carbon dioxide and stirring at a temperature around 10° C., adding the carbaminate, thus obtained in the form of a jelly-like mass, to a solution of phosgene at a temperature around 0° C. and heating the mixture to a temperature of about 160 to 180° C. while introducing phosgene for a period of 8 to 10 hours to thereby finish the phosgenation.

The invention is further illustrated by the following typical example of a specific embodiment thereof:

*Example*

2000 kilograms of o-dichlorobenzene are placed in a stainless steel-plated vessel cooled with ice and sodium chloride. The vessel is swept out with dry carbon dioxide, and a carbon dioxide pressure of about 1.5 atmospheres is applied. Over a period of 7 hours there is added through a pipe leading to the bottom of the vessel a solution of 400 kilograms of hexamethylene diamine in 2200 kilograms of o-dichlorobenzene at a temperature of 10° C. while stirring and introducing carbon dioxide so as to maintain a carbon dioxide pressure of 1½ atmospheres. Over a period of 9 hours the carbaminate, obtained in the form of a jelly-like mass, is driven while stirring in a second stainless steel-plated vessel which contains a solution of 600 kilograms of phosgene in 2200 kilograms of o-dichlorobenzene and is cooled with sodium chloride and ice. When the addition of the carbaminate is complete the mixture is heated over a period of 4 hours to a temperature of about 150 to 160° C. and treated for 10 hours at this temperature with 200 kilograms of phosgene per 1 hour while stirring. Thus, a clear solution is obtained. Upon removal of excess phosgene by blowing with dry nitrogen the solution is concentrated so as to contain 85% of diisocyanate and then distilled in a distillation apparatus equipped with a stirrer. Thus, 542 kilograms of a solution containing 91% of hexamethylene diisocyanate and 2.5% of chlorohexane isocyanate are obtained. The distillation residue amounts to 50 kilograms. The yield is 85% of the theoretical.

In contrast thereto, 492 kilograms of a solution, containing 85% of hexamethylene diisocyanate and 7.6% of chlorohexane isocyanate, and 100 kilograms of distillation residue are obtained according to the prior art.

I claim:

1. In the process for the production of alkylene diisocyanates, in which phosgene is reacted with a carbaminate of an aliphatic diamine, the improvement which comprises effecting the reaction with an aliphatic diamine carbaminate formed by contacting an alkylene diamine with an excess of carbon dioxide in an inert solvent at a temperature ranging from 0 to 15° C.

2. In the process for the production of alkylene diisocyanates, in which phosgene is reacted with a carbaminate of an aliphatic diamine, the improvement which comprises effecting the reaction with an aliphatic diamine carbaminate formed by adding a solution of the alkylene diamine in an inert solvent to an inert solvent containing carbon dioxide at a temperature ranging from 0 to 15° C. while maintaining an excess of carbon dioxide.

3. In the process for the production of alkylene diisocyanates in which a carbaminate of an alkylene diamine is reacted with phosgene in an inert solvent at a temperature around 0° C., and thereafter the reaction mixture is heated to a temperature of about 150 to about 160° C. to thereby complete the phosgenation, the improvement which comprises effecting the initial reaction with phosgene with an alkylene diamine carbaminate formed by adding a solution of the alkylene diamine in an inert solvent to an inert solvent containing carbon dioxide at a temperature of from 0 to 15° C. while maintaining an excess of carbon dioxide.

4. A process for the production of alkylene diisocyanates, which comprises reacting phosgene at a temperature around 0° C. in an inert solvent with a carbaminate obtained by adding a solution on an alkylene diamine in an inert solvent to an inert solvent containing carbon dioxide at a temperature of from 0 to 15° C. while maintaining an excess of carbon dioxide, heating the resultant mixture to a temperature of from about 150 to about 160° C. with the introduction of phosgene thereto, and recovering an alkylene diisocyanate from this reaction mixture.

5. A process for the production of carbaminates suitable for conversion by phosgenation into alkylene diisocyanates, which comprises adding at a temperature of from 0 to 15° C. a solution of an alkylene diamine in an inert solvent to an inert solvent containing carbon dioxide, while maintaining an excess of carbon dioxide.

References Cited in the file of this patent

FOREIGN PATENTS 876,238    Germany _____ May 11, 1953

OTHER REFERENCES

De Bell et al.: "German Plastics Practice," page 301 (1946).